United States Patent
Quase

[15] 3,656,623
[45] Apr. 18, 1972

[54] LIQUID SEPARATION APPARATUS

[72] Inventor: Harold G. Quase, Potomac, Md.
[73] Assignee: Underwater Storage, Inc., Washington, D.C.
[22] Filed: Oct. 16, 1969
[21] Appl. No.: 866,931

[52] U.S. Cl. ............................ 210/242, 210/251, 210/416, 210/DIG. 21
[51] Int. Cl. .................... B01d 17/02, E02b 15/04
[58] Field of Search .................. 210/242, 137, DIG. 21, 251, 210/416; 115/16

[56] References Cited

UNITED STATES PATENTS

| | | | |
|---|---|---|---|
| 1,591,024 | 7/1926 | Dodge | 210/242 |
| 2,024,274 | 12/1935 | Campini | 115/11 |
| 3,245,539 | 4/1966 | Earle | 210/242 |
| 2,876,903 | 3/1959 | Lee | 210/242 |
| 3,595,392 | 7/1971 | Markel | 210/242 |

Primary Examiner—Samih N. Zaharna
Assistant Examiner—Frederick F. Calvetti
Attorney—Littlepage, Quaintance, Wray & Aisenberg

[57] ABSTRACT

A partially submergible platform has internal separation tanks, which are provided with screens for removing solid materials from water. Skimmers remove a relatively light immiscible liquid before returning the water to the body from which it is taken. In one form of the invention, contaminated water is pumped upward into separation tanks, and gravity drains the separated water from the tank and vessel. In another embodiment, contaminated water flows into separation tanks, and purified water is pumped from the tanks, preferably rearwardly, for propelling the craft through the water. Gates form lower edges of intakes, so that the amount of water taken into the boat and the depth of the intake may be controlled.

4 Claims, 8 Drawing Figures

PATENTED APR 18 1972
3,656,623
SHEET 1 OF 2
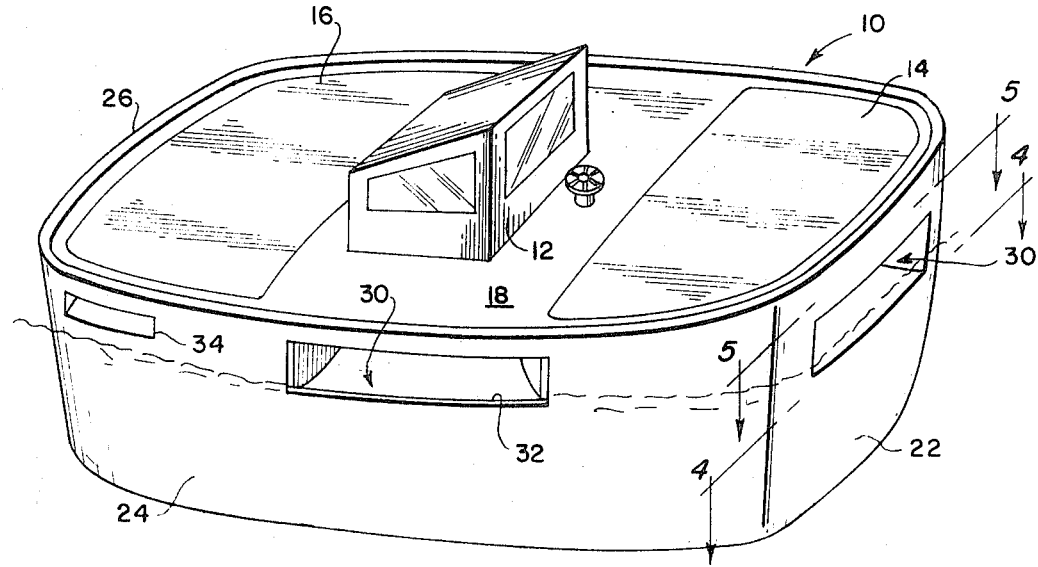
FIG. 1
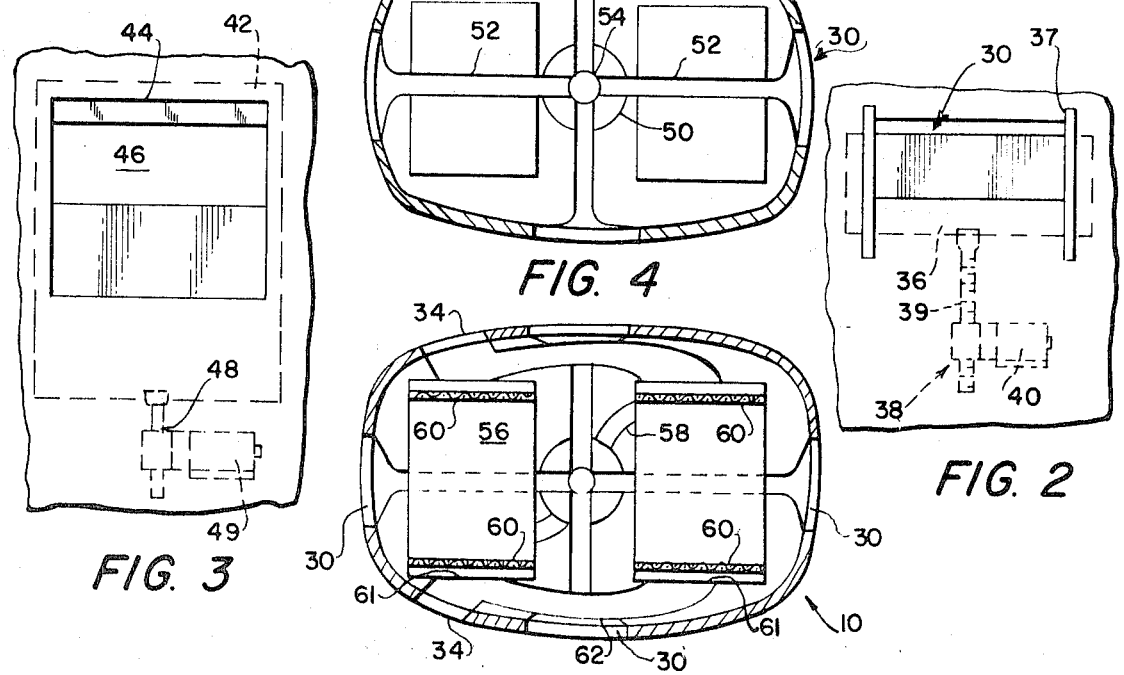
FIG. 3
FIG. 4
FIG. 5
FIG. 2
INVENTOR
HAROLD G. QUASE
Littlepage, Quaintance, Wray & Aisenberg
ATTORNEYS

INVENTOR
HAROLD G. QUASE

LIQUID SEPARATION APPARATUS

BACKGROUND OF THE INVENTION

Separation of immiscible liquid and undissolved solid materials from a first liquid has many uses. Generally, separation is employed to remove a small quantity of liquid or solids from a large quantity of another liquid. For convenience, the smaller quantities are referred to as contaminant materials, and the large body of liquid is referred to as contaminated or decontaminated. It is recognized that the contaminants may be useful products, that their presence in a large body of fluid may be desirable, and that their recovery by liquid separation may be economically important.

Removal of oil slicks from bodies of water is a very important objective of some known liquid separation systems. Oil skimmers have been designed as platforms permanently supported in man-made collecting and separating basins in which water levels are precisely controlled. Other oil skimming devices have been constructed as floating platforms for mooring or anchoring in bodies of water, such as collecting basins, for removing oil therefrom before decontaminated water is passed out of the basin. Basin water level control is not significant when floating devices are used. Still other oil skimming platforms have been constructed as self-propelled water craft, which may be freely moved about bodies of water for approaching oil slicks and for skimming oil therefrom.

Waterborne plant harvesters have been devised to recover edible seaweeds and fishes from waterways and to remove waterway obscuring weeds. Most skimming and harvesting devices have tanks or holds for storage of separated contaminants. As the tanks and holds are filled, floating platform or craft displacement becomes greater. Some provision must be made for displacement change which is often accompanied by increased liquid intake and increased submergence of intakes. Often provision is made simply by increasing the size of operating apparatus, so that it may operate in varying water levels.

Heretofore, no versatile liquid separation apparatus has been available for the physical separation of both liquid and solid contaminates from a body of liquid. Moreover, the control of intake volume and depth in floating platforms with contaminant storage facilities has remained a problem.

SUMMARY OF THE INVENTION

The present invention provides liquid separation apparatus. As an example, a floating platform which is a water craft is configured for use in cleaning any body of water. Contaminated water is drawn into separation tanks. Screens in the outlet of the tanks prevent the outflow of contaminant materials when water is exhausted into the surrounding body of water. Main separation tanks preferably have liquid level control devices for controlling levels of the water within the tanks, thus providing a constant ballast and a relatively constant submergence of the craft within the body of water.

Included in some embodiments of the invention are skimmer devices within the separation tanks for skimming the surface of water to remove floating liquids, particularly oil, therefrom. Separate oil storage tanks are in the water craft to hold collected oil. Preferably, the tanks are filled with water for ballast. Oil is added at the top of the tank, and the tank is fitted with a vent opening near the bottom of the tank for exhausting water from the tank as it fills with oil.

In a preferred embodiment of the invention, lower edges of the intake ports in exterior surfaces of the craft are constructed as vertically slideable gates. The depth of surface water taken into the gated ports may be precisely controlled, and the ports may be adjusted according to the submergence of the craft to maintain a uniform intake flow rate. Gate levels may be automatically coordinated in known manners with pump flow rates to further promote efficient constant flow within the separation apparatus.

In another embodiment of the invention, the gates may be constructed to cover the entire intake, with apertures in the gates designed for vertical positioning. Thereby, fluid may be taken from precise submergence levels in which solid contaminant concentration is greatest.

In one form of the invention, the same pump means which is used to expel water from the separation tanks also propels the craft by jetting the water rearward. A plurality of rearward jets, usually two, is employed. In a conventional manner, jet ports may be independently valved, or jets may be deflected to turn the craft. In embodiments wherein fluid freely falls from the outlets, craft are driven in a conventional manner by propellers.

Platforms of the present invention are suitable for permanent mounting as rigid structures in man-made or natural collection basins. Permanently mounted devices preferably are used with floating booms which tend to gather and concentrate the foreign liquid or solids as water flows toward intakes of the platforms.

Platforms of the present invention may be constructed as floating platforms for anchoring in bodies of water. When bodies of water have flow characteristics, such as currents, it is preferable to use flow directors, such as floating oil booms, to concentrate contaminates as they flow toward the platforms. Similar floating platforms can also be employed for towing by slow moving ships.

While "platform" has been used to designate a support for the separation apparatus, the disclosed apparatus is particularly useful when the platform is broken into several parts, with for example the intake and separation tank being mounted on one part and contaminant storage means on another part. Alternatively, intakes may be constructed on one floating platform, with a remote pump on another platform section, a separation tank on still another platform section, and a contaminant storage tank on still another platform section. Where the removed contaminant is a physically separable liquid, the contaminant liquid may be conveniently pumped to any storage location. When the contaminants are solids, the separation system may be shut down periodically for removal of solids from the separation tank, either by opening the tank and removing material with handling apparatus, or by pumping liquid with a high solids concentration from the tank to a remote storage facility. Alternatively, especially in the case of heavy solids, the tank base may be continually cleaned of solid material, such as is conventional in sewage treatment sludging operations.

The apparatus of the present invention is especially useful for the removal of noxious or bothersome marine life, for example animals, such as jellyfish, Portuguese man-of-war, or other hydrozoa, or water plants, especially floating plants, such as water hyacinths. When undesirable effects of the marine life are completely destroyed by crushing and grinding with residues causing no deleterious effects, the pump means may include comminuting means which grinds and comminutes the solids. In such apparatus, it is preferable to have the pump and comminuting means interposed between the intakes and separation tanks, so that large particles and buoyant particles passing through the comminuting means will be held in the separation tank. Alternatively, the comminuting means may be placed in the exhaust system. Buoyant materials are retained in the separation tanks, and only heavy sinkable materials are ground. As in the case of oil separation, separation tank exhausts are below the liquid surfaces so that floating matter is retained in the separation tanks.

BRIEF DESCRIPTION OF THE DRAWINGS

FIG. 1 is a perspective view of a water craft constructed according to the present invention.

FIG. 2 is a detail of a gate control for varying the height of the lower edge of an intake port.

FIG. 3 is a detail of a gate control for varying the submergence of an intake port.

FIG. 4 is a horizontal sectional view taken along line 4—4 of FIG. 1.

FIG. 5 is a horizontal cross-sectional view taken at a higher level, along line 5—5 in FIG. 1.

DETAILED DESCRIPTION OF THE DRAWINGS

Figure 8:
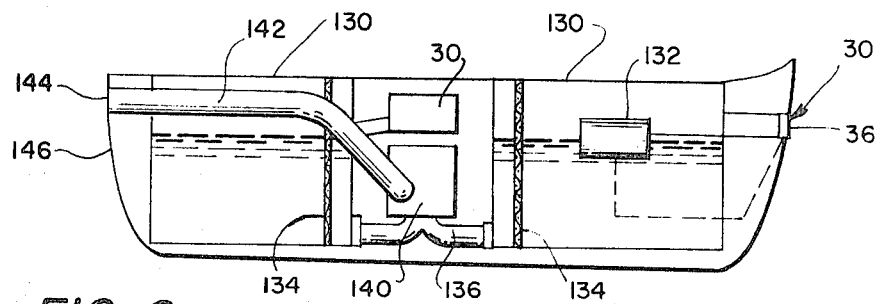
FIG. 8 is a modified form of the invention in which decontaminated water is jetted rearward from a craft to provide propulsion for the craft.

With reference to FIG. 1, a platform, which in this case is a water craft is generally referred to by the numeral 10. A deck house 12 is provided on the craft. Large hatches 14 and 16 in deck 18 provide access to the separation tanks.

Craft 10 has a bow portion 22, side portions 24 and a stern portion 26. Intake means 30 are provided in the bow, side and stern portions.

Lower edges 32 of intakes 30 are vertically adjustable so that the depth and amount of water taken in may be precisely controlled. Outlet ports 34 are provided near the rear of the craft to release decontaminated water back to the body of water. As shown in FIG. 2, intakes 30 are constructed with gates 36, which are slideable in tracks 37 at opposite vertical edges of the intakes. Elevator means 38 for raising and lowering gates 36 have screws 39 which are driven by motor 40. The position of gate 36 within intake 30 is precisely controlled as desired for the appropriate submergence level and volumetric flow. Gate 36 may be raised to completely obscure the intake when it is desired to cease the cleaning process or when water is to be taken from only one portion, such as the bow, of the craft.

In FIG. 3, a modified gate 42 is shown in intake opening 44. Gate 42 has a central elongated opening 46, which may be positioned vertically within intake 44 for controlling the depth at which water is drawn into intake 44. Opening 46 may be raised to the upper limits of intake 44, so that the lower edge of opening 46 in gate 42 operates as gate 36 shown in FIG. 2. In a similar manner screw 48 and motor 49 may drive gate 42 upward to its full extension, wherein the lower part of gate 42 seals intake 44.

FIG. 4 is a horizontal cross-sectional detail taken along line 4—4 in FIG. 1, showing the arrangements of the intakes 30 with a central pumping means 50. Suction channels 52 are connected to a suction side 54 of the pump 50. Each channel 52 is provided with a conventional gate valve so that any channel may be taken off line, or so that flow may be regulated within the channels. The channel gate valves, for example, may be sliding intake gates 36, such as shown in FIG. 2.

FIG. 5 is a cross-sectional view similar to that shown in FIG. 4, with the exception that FIG. 5 is taken at a higher level of craft 10, along line 5—5 of FIG. 1.

Separation tanks 56 receive contaminated water from pump discharge lines 58. Inlets in tanks 56 are configured so that contaminated water washes across the surface of screens 60. Thus, contaminates are washed away from surfaces of the screens, compaction is avoided, and flow of decontaminated water through the screening means is promoted. Alternatively, water flow is slowed in the collection tank, and, before exiting the tank, the water passes through screens 60. After passing through screens 60 and outlets 61, the decontaminated water flows out of separating tanks 56 through exhaust means which include outlets 61 in tanks 56, rearward extending channels 62, and exhaust ports 34 near the stern of the vessel.

Apertures in screens 60 are sized according to the contaminant material intended to be removed. Screening means 60 may be made of conventional heavy duty wire sieve-like materials, or the screens may be foraminous plates. One inch openings are sufficiently small to remove most marine plants. When jellyfish separation is intended, openings in screens 60 must be no greater than three-eighths inch, and preferably about one-fourth inch. Very fine screens or porous membranes may be employed for separating liquid contaminants from the water or for separating two liquids.

Figure 6:
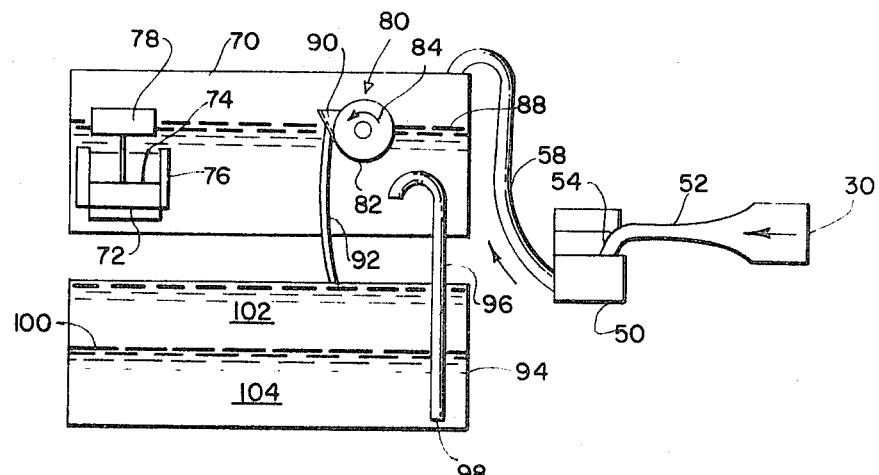
FIG. 6 is a schematic detail of apparatus of the invention which is similar to the apparatus shown in FIGS. 4 and 5, with the addition of an oil skimming device and an oil storage tank.

A modified form of the separation apparatus is shown in FIG. 6. Contaminated water enters intake 30 and passes through channel 52 and suction side 54 of pump 50 and then through pump discharge line 58 into separation tank 70. Outlet 72 is provided with a valve gate 74, which slides in channels 76. Gate 74 is controlled by float 78 to close the exhaust port 72 as water level falls within the separation tank 70. Thus, a substantially constant water level is maintained.

Separation tank 70 is provided with a skimmer means 80 for removing immiscible liquids from the surface of the water. Oil separation apparatus 80 has a drum 82, which rotates in the direction shown by arrow 84, using the surface tension effect of the floating oil 88 to lift the oil. Doctor blade 90 removes oil from the drum, and the oil passes through tube 92 to an oil storage tank 94. To ensure a constant buoyancy of the craft, oil tank 94 is filled with water when no oil is present in the tank. As oil is admitted through line 92 to the top of storage tank 94, the oil-water interface is lowered, and water is forced out of overflow tube 96 which has an opening 98 near the bottom of the tank. The upper end of tube 96 terminates in an overflow exhaust port which is above the water line so the pipe will not admit water. The overflow port is below the oil line opening at the doctor blade so that a positive oil filling pressure is exerted on tank 94. Tank 94 acts as a secondary separation tank. Flow in tank 94 is slow; there is little turbulence. Any water that has been lifted in by the rotating drum and removed by the doctor blade is gravitationally separated from the oil in tank 94.

Since the craft operates in relatively calm water, the interface 100 between the oil 102 and water 104 is relatively stable. When interface 100 reaches the bottom 98 of overflow pipe 96, oil begins spewing from the overflow pipe, indicating that the oil tank 94 must be emptied.

An interface flexible membrane may be sealed around the center of the tank 94. The membrane may be displaced either upward or downward as the tank is emptied or filled, maintaining separation between the two liquids.

Figure 7:
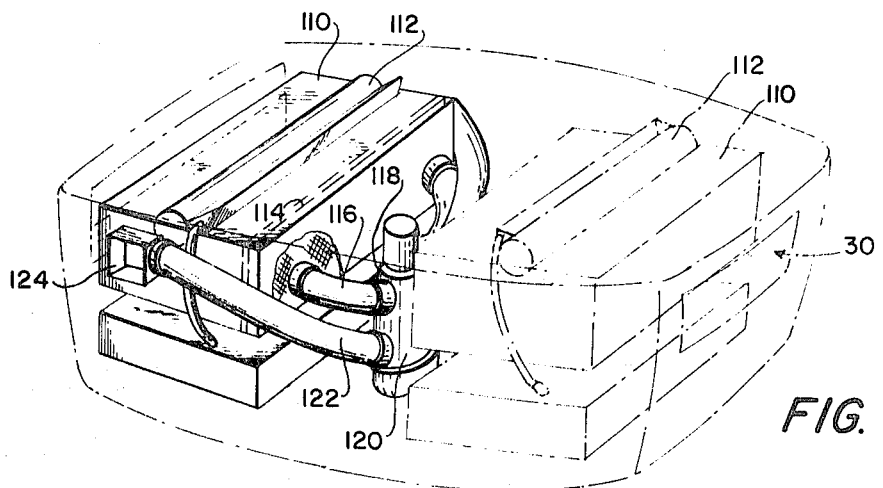
FIG. 7 is a modified form of the invention in which contaminated water flows directly into a separation tank and is pumped from the tank to exhaust ports.

FIG. 7 is a schematic detail of a slightly modified form of the invention in which contaminated fluid flows through intake 30 directly into separation tanks. Contaminated water flows directly into separation tanks 110 from intake 30. Rotating drum oil separator 112 removes oil from the surface of the water, and clean water is withdrawn through screens 114 to lines 116 connected with the suction side 118 of pumps 120. Discharge lines 122 from the pump are connected to exhaust ports 124 near the rear of the craft.

In a modification of the invention shown in FIG. 8, contaminated water flows through intakes 30 into tanks 130. Float 132 within tank 130 is connected through electromechanical linkage to control the opening of gate 36 for maintaining a substantially constant level of water within tank 130. Screen 134 has orifices of sizes sufficiently small to restrict solid matter intended to be removed from the water passing through the screen. Water from the tanks is drawn into the suction side 136 of pump 140. Exhaust lines 142 are connected to jet port openings 144 in the stern 146 of the craft. Water is jetted rearward for propulsion of the craft. In the embodiment shown, intakes 30 on the sides of the craft allow water to flow into rear separation tanks 130.

Covers of all separation tanks are removable so that the separation tanks may be periodically cleaned and so that solids may be removed therefrom. Oil reservoirs are provided with pumps and discharge lines for daily emptying or emptying as required when in port.

That which is claimed is:

1. Separation apparatus for separating foreign material from a liquid and comprising:
   a. a platform constructed for at least partial submergence in a body of the liquid and having sidewalls bounded by lower and upper edge portions thereof;

b. at least one sidewall having intake means therein intermediate the lower and upper edge portions thereof, the intake means comprising lower edge means submerged in the liquid body and means associated with the intake means to adjust vertically the position of said lower edge;

c. separation tank means disposed within the platform and connected to and communicant with the intake means;

d. means including a pump for conducting to the separation tank means ambient liquid from the liquid body and passing through the intake means;

e. screening means positioned in the separation tank means for removing foreign material from the liquid;

f. outlet means in the separation tank means downstream from the screening means for discharging liquid from said tank means;

g. exhaust port means in the platform connected to and communicant with the pump discharge means for exhausting liquid from the platform; and h. skimmer means in an upper portion of the separation tank means for removing a relatively light liquid from the separation tank means and separate storage means connected to the skimmer means for storing the relatively light liquid.

2. Separation apparatus according to claim 1 wherein the means associated with the intake means comprises track means mounted on the sidewall adjacent lateral edges of the intake means, movable lower edge means comprising gate means mounted in the track means, and elevator means connected to the gate means and to the platform for raising and lowering the gate means in the track means for controlling liquid passing through the intake means.

3. Separation apparatus according to claim 1 wherein the platform comprises a water craft having a bow, a stern and side portions; the body of liquid is a body of water which forms a water line where the surface intersects the sidewalls of the platform; the intake means are plural means positioned along the water line on the bow, on the stern and on the side portions; and the exhaust means comprise exhaust ports mounted in the water craft adjacent the stern portion and above the water line.

4. Separation apparatus according to claim 1 wherein the platform comprises a water craft having a bow, a stern and side portions, and the exhaust port means is located in the stern whereby the pump means propels the water craft by jetting fluid through the exhaust port means.

* * * * *